United States Patent
Relyea et al.

(10) Patent No.: US 9,231,952 B2
(45) Date of Patent: *Jan. 5, 2016

(54) KEY-BASED CONTENT MANAGEMENT AND ACCESS SYSTEMS AND METHODS

(71) Applicant: Verizon Patent and Licensing Inc., Arlington, VA (US)

(72) Inventors: Donald H. Relyea, Dallas, TX (US); Brian F. Roberts, Dallas, TX (US); Michelle Felt, Randolph, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/329,051

(22) Filed: Jul. 11, 2014

(65) Prior Publication Data

US 2014/0321650 A1 Oct. 30, 2014

Related U.S. Application Data

(63) Continuation of application No. 12/164,364, filed on Jun. 30, 2008, now Pat. No. 8,787,579.

(51) Int. Cl.
| | |
|---|---|
| H04L 9/08 | (2006.01) |
| G06F 21/00 | (2013.01) |
| H04L 29/06 | (2006.01) |
| G06F 21/10 | (2013.01) |
| G11B 20/00 | (2006.01) |

(52) U.S. Cl.
CPC .............. *H04L 63/10* (2013.01); *G06F 21/10* (2013.01); *H04L 63/062* (2013.01); *H04L 63/0876* (2013.01); *H04L 63/102* (2013.01); *G06F 2221/2141* (2013.01); *G11B 20/0021* (2013.01); *G11B 20/00731* (2013.01); *H04L 9/0819* (2013.01); *H04L 2463/101* (2013.01)

(58) Field of Classification Search
CPC ......... G06F 21/10; G06F 21/60; G06F 21/62; G06F 21/6209; G06F 2221/2141; H04L 63/06; H04L 63/062; H04L 63/08; H04L 63/0876; H04L 63/10; H04L 2463/101; H04L 2463/103; G11B 20/0021; G11B 20/00731
USPC .............. 726/2–4, 27–29; 713/168, 171, 181; 380/277, 278; 709/229; 705/51, 57, 59
See application file for complete search history.

(56) References Cited

U.S. PATENT DOCUMENTS

| | | | |
|---|---|---|---|
| 5,600,726 A | 2/1997 | Morgan et al. | |
| 6,421,733 B1 * | 7/2002 | Tso et al. | 709/246 |
| 7,305,453 B2 * | 12/2007 | Awamoto et al. | 709/217 |
| 7,330,976 B2 * | 2/2008 | Yumoto | 713/182 |
| 7,380,120 B1 * | 5/2008 | Garcia | 713/160 |

(Continued)

*Primary Examiner* — Zachary A Davis

(57) ABSTRACT

An exemplary method includes receiving data representative of a content instance over a network from an access device associated with a first user, encrypting the content instance in response to a command initiated by the user by way of one or more graphical user interfaces, providing a key configured to facilitate decryption of the encrypted content instance, creating at least one access rule corresponding to the encrypted content instance, transmitting data representative of the encrypted content instance to a requesting access device associated with a requesting user, receiving, from the requesting access device, data representative of a request to access the key over the network, and performing a predefined action related to the key in response to the request and in accordance with the at least one access rule.

20 Claims, 18 Drawing Sheets

(56) References Cited

U.S. PATENT DOCUMENTS

| | | |
|---|---|---|
| 7,515,717 B2 * | 4/2009 | Doyle et al. ............... 380/277 |
| 7,548,621 B1 | 6/2009 | Smith et al. |
| 7,574,731 B2 | 8/2009 | Fascenda |
| 7,577,838 B1 | 8/2009 | Rossmann |
| 7,584,226 B2 | 9/2009 | Fatula, Jr. et al. |
| 7,735,132 B2 | 6/2010 | Brown et al. |
| 7,748,045 B2 | 6/2010 | Kenrich et al. |
| 8,185,642 B1 * | 5/2012 | Tock et al. ............... 709/229 |
| 8,787,579 B2 * | 7/2014 | Relyea et al. ............ 380/278 |
| 2004/0022390 A1 | 2/2004 | McDonald et al. |
| 2004/0049574 A1 * | 3/2004 | Watson et al. ............ 709/224 |
| 2005/0289397 A1 | 12/2005 | Haruki et al. |
| 2006/0153380 A1 * | 7/2006 | Gertner ..................... 380/221 |
| 2006/0282680 A1 | 12/2006 | Kuhlman et al. |
| 2007/0043667 A1 | 2/2007 | Qawami et al. |
| 2007/0180237 A1 | 8/2007 | Grieco et al. |
| 2007/0239998 A1 * | 10/2007 | Beck ......................... 713/193 |
| 2008/0022361 A1 | 1/2008 | Bharadwaj et al. |
| 2009/0075630 A1 | 3/2009 | McLean |
| 2009/0327305 A1 | 12/2009 | Roberts et al. |

* cited by examiner

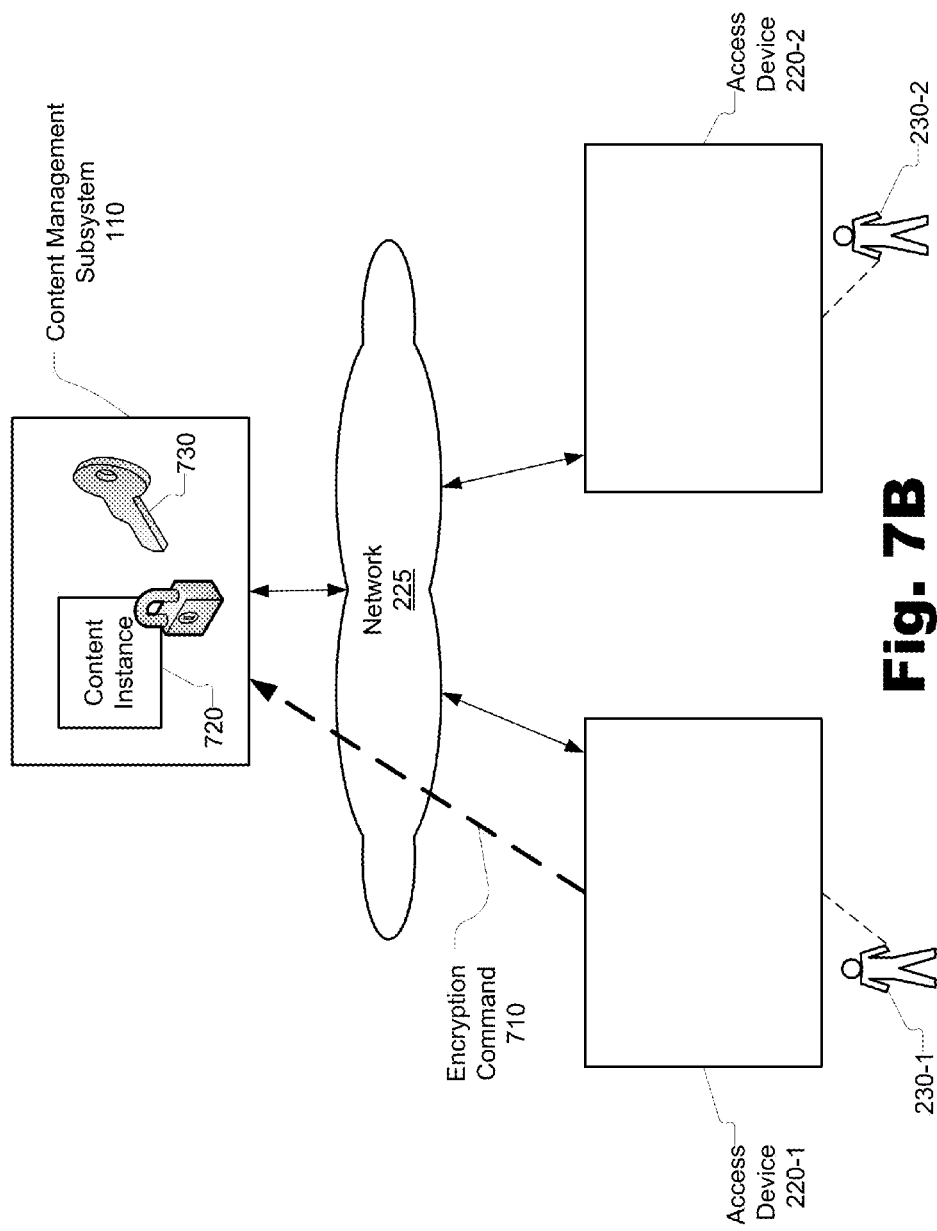

Fig. 13

My Content

| Upload | Download | Encrypt | Access Rules | Privacy |

Specify Access Rules for:

📄 Resume — 1020-1

|  | Full | Read Only | None |
|---|---|---|---|
| Personal Computer | ☑ | ☐ | ☐ |
| Mobile Phone | ☐ | ☐ | ☑ |
| Handheld Device | ☐ | ☑ | ☐ |
| Broadband Device | ☑ | ☐ | ☐ |

1310 (rows), 1320 (columns)

Bart
Busy

- Profile Info
- My Content
- Preferences
- Histories

1300

KEY-BASED CONTENT MANAGEMENT AND ACCESS SYSTEMS AND METHODS

RELATED APPLICATIONS

This application is a continuation application of U.S. patent application Ser. No. 12/164,364, filed Jun. 30, 2008, and entitled KEY-BASED CONTENT MANAGEMENT AND ACCESS SYSTEMS AND METHODS, which is hereby incorporated by reference in its entirety.

BACKGROUND INFORMATION

Advances in electronic communications technologies have interconnected people and allowed for distribution of information perhaps better than ever before. To illustrate, mobile phones, which were previously used for voice communications only, are increasingly being used to acquire and transmit photographs, video, audio, and/or other content to other mobile phones and to other types of electronic devices.

As the variety of electronic devices used to acquire, transmit, and access content has become more diverse, it has become increasingly desirable for content acquired by a particular electronic device to be accessible by other electronic devices. For example, a particular user may desire to access content acquired by a mobile phone with a personal computer, set-top box, handheld device, and/or any other electronic device.

The user may additionally or alternatively desire to allow other users to access content owned or otherwise associated with the user. For example, a user may desire to share digital photographs, documents, and/or other content instances with other users. However, once a shared content instance has been downloaded by the other users, it is often difficult, if not impossible, for the owner of the content to revoke or otherwise control access to the downloaded content.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 7A-7E show an exemplary sequence of communications that may occur between a content management subsystem and first and second access devices when a user of the first access device instructs the content management subsystem to encrypt a content instance according to principles described herein.

FIG. 13 illustrates an exemplary GUI configured to allow a user to specify one or more access rules that are based on one or more access device profiles according to principles described herein.

DETAILED DESCRIPTION OF PREFERRED EMBODIMENTS

Figure 1:
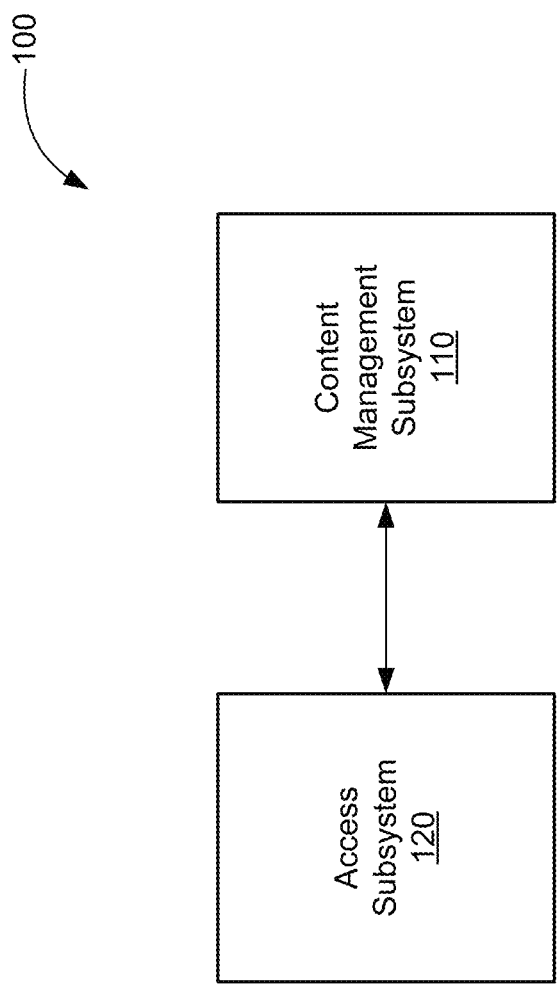
FIG. 1 illustrates an exemplary key-based content management and access system according to principles described herein.

Key-based content management and access systems and methods are described herein. The exemplary systems and methods may provide a centralized, efficient, and secure experience for users desiring to share and control access to shared content acquired or otherwise provided by various types of access devices. The exemplary systems and methods may further provide ways for a user to control how other users access content owned or otherwise associated with the user.

In some examples, an access subsystem associated with a user may be selectively and communicatively coupled to a content management subsystem over a network. The access subsystem is configured to transmit data representative of a content instance to the content management subsystem and provide an interface (e.g., a graphical user interface ("GUI")) configured to allow the user to define at least one access rule corresponding to the content instance. The at least one access rule may be based on at least one user profile and/or at least one access device profile and may specify or define one or more permissions, conditions, associations, and/or other factors that are to be complied with for other users to access the content instance.

As will be described in more detail below, the user may direct the content management subsystem to encrypt the content instance. In some examples, the content instance is encrypted with a key, which may be stored by the content management subsystem and subsequently distributed to one or more access devices attempting to access the encrypted content instance.

For example, an access device may transmit data representative of a request to access the key to the content management subsystem over the network. The content management subsystem may process the request and perform a predefined action related to the key in response to the request and in accordance with the at least one access rule. The predefined action may include, but is not limited to, transmitting data representative of the key to the access device such that the access device may use the key to decrypt and access the encrypted content instance, denying access to the key so that the access device may be prevented from decrypting and accessing the encrypted content instance, and/or otherwise processing the encrypted content instance and/or key.

Hence, the systems and methods described herein may enable a user to allow, modify, and/or revoke access to one or more content instances stored within a content management subsystem by certain users, groups of users, access devices, groups of access devices, and/or types of access devices.

As used herein, the term "content instance" refers generally to any data record or object (e.g., an electronic file) storing or otherwise associated with content, which may include electronic data representative of text, one or more messages (e.g., short message service ("SMS") messages, electronic mail messages, or multimedia message service ("MMS") messages), one or more symbols, one or more graphics, one or more images (e.g., digital photographs and video frames), email contacts, video, audio, multimedia, video games, or any segment, component, or combination of these or other forms of electronic data that may be viewed or otherwise experienced by a user.

FIG. 1 illustrates an exemplary key-based content management and access system 100 (or simply "system 100"). As shown in FIG. 1, system 100 may include a content management subsystem 110 and an access subsystem 120 configured to communicate with one another. Access subsystem 120 and content management subsystem 110 may communicate using any communication platforms and technologies suitable for transporting data representative of content, content metadata, content management commands, and/or other communications, including known communication technologies, devices, media, and protocols supportive of remote or local data communications. Examples of such communication technologies, devices, media, and protocols include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), Evolution Data Optimized Protocol ("EVDO"), radio frequency ("RF") signaling technologies, signaling system seven ("SS7") technologies, Ethernet, in-band and out-of-band signaling technologies, and other suitable communications networks and technologies.

In some examples, system 100 may include any computer hardware and/or instructions (e.g., software programs), or combinations of software and hardware, configured to perform the processes described herein. In particular, it should be understood that components of system 100 may be implemented on one physical computing device or may be implemented on more than one physical computing device. Accordingly, system 100 may include any one of a number of computing devices, and may employ any of a number of computer operating systems.

Accordingly, the processes described herein may be implemented at least in part as computer-executable instructions, i.e., instructions executable by one or more computing devices, tangibly embodied in a computer-readable medium. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 2:
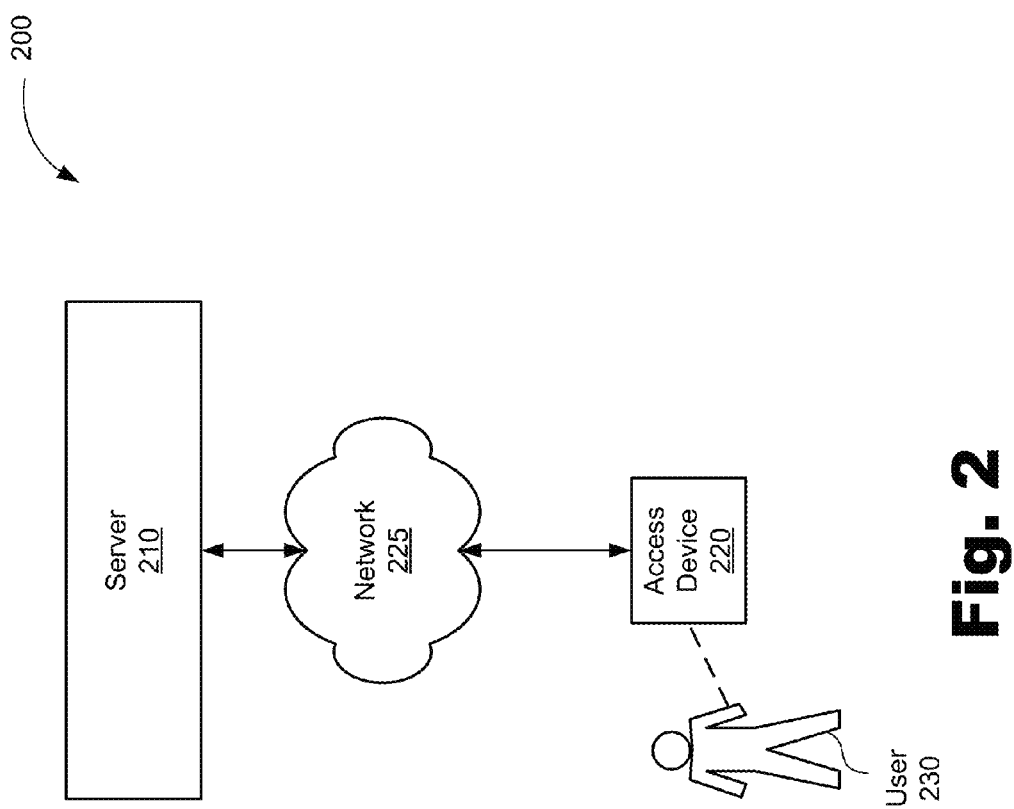
FIG. 2 illustrates an exemplary implementation of the system of FIG. 1 according to principles described herein.

FIG. 2 illustrates an exemplary implementation 200 of system 100. In implementation 200, content management subsystem 110 may include or be implemented within at least one server 210, and access subsystem 120 may include or be implemented within at least one access device 220 configured to communicate with server 210 by way of a network 225. Network 225 may include one or more networks, including, but not limited to, wireless networks, mobile telephone networks (e.g., cellular telephone networks), closed media networks, subscriber television networks, cable networks, satellite networks, the Internet, intranets, local area networks, public networks, private networks, optical fiber networks, broadband networks, narrowband networks, voice communications networks, Voice over Internet Protocol "(VoIP") networks, Public Switched Telephone Networks ("PSTN"), and any other networks capable of carrying data representative of content, data associated with content (e.g., metadata), data management commands, and/or communications signals between access device 220 and server 210. Communications between the server 210 and the access device 220 may be transported using any one of above-listed networks, or any combination or sub-combination of the above-listed networks. In certain exemplary embodiments, network 225 includes a mobile telephone network and/or a subscriber television network.

Access device 220 may be associated with one or more users, which in certain embodiments may be subscribers to or users of one or more services (e.g., a wireless telephone service) provided over network 225. As an example, FIG. 2 shows user 230 as being associated with access device 220. The exemplary user 230 and the association of user 230 with access device 220 are shown for illustrative purposes. Other user associations with access device 220 may be defined in system 100.

Access device 220 may include any device configured to perform one or more of the processes described herein, including communicating with and/or transmitting and receiving content, data associated with content (e.g., metadata), and/or content operation commands to/from content management subsystem 110 by way of network 225. Access device 220 may include, but is not limited to, a computing device (e.g., a desktop or laptop computer), a set-top box, a communication device, a wireless computing device, a wireless communication device (e.g., a mobile phone), a personal digital assistant, a content recording device (e.g., a camera, audio recorder, video camera), a vehicular computing and/or communication device, a content-enabled device, a gaming device, and/or any other device configured to acquire, transmit, receive, decrypt, access, or otherwise process content.

Figure 3:
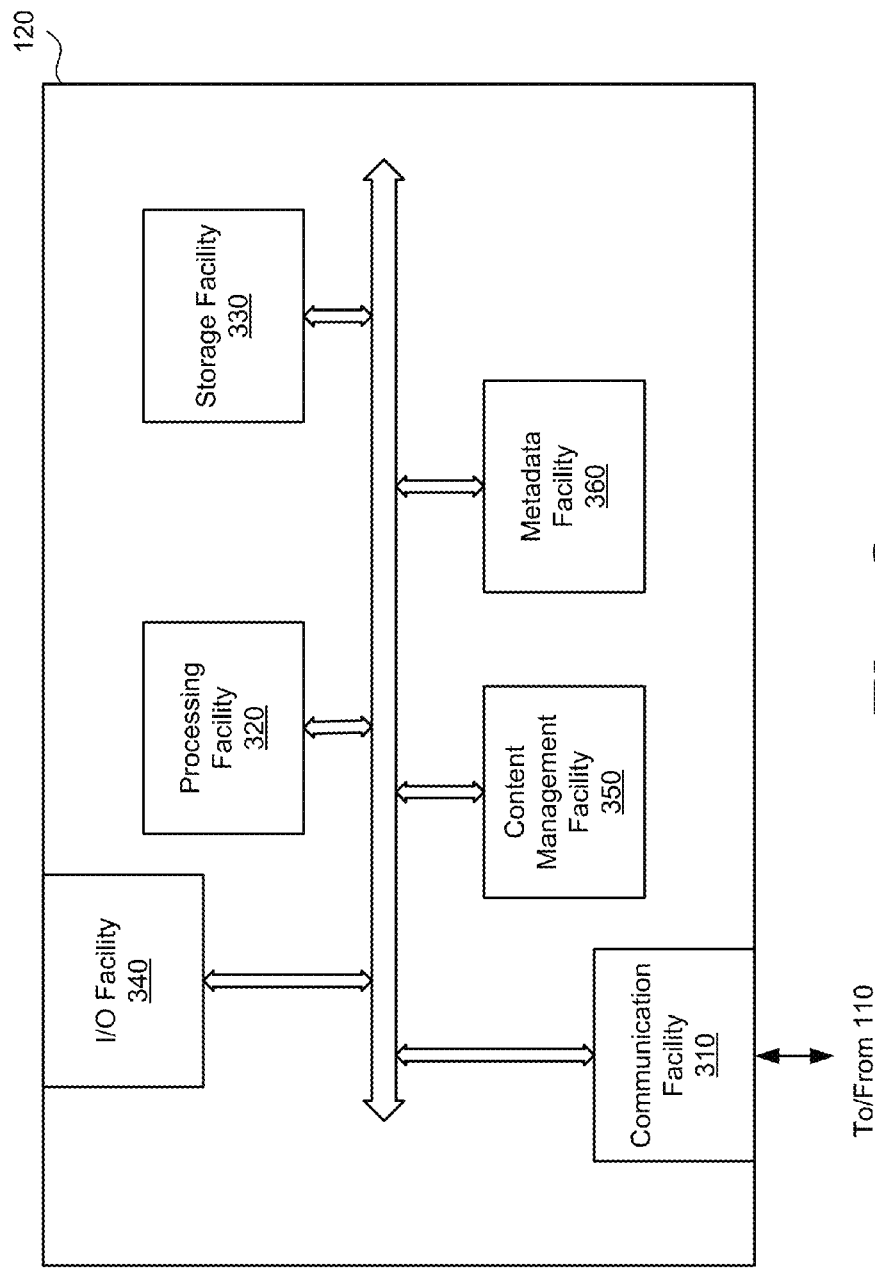
FIG. 3 illustrates components of an exemplary access subsystem according to principles described herein.

FIG. 3 illustrates components of an exemplary access subsystem 120. As shown in FIG. 3, access subsystem 120 may include a communication facility 310, processing facility 320, storage facility 330, input/output ("I/O") facility 340, content management facility 350, and metadata facility 360 communicatively connected to one another. The facilities 310-360 may be communicatively connected using any suitable technologies. Each of the facilities 310-360 may be implemented as hardware, computing instructions (e.g., software) tangibly embodied on a computer-readable medium, or a combination of hardware and computing instructions configured to perform one or more of the processes described herein. In certain embodiments, for example, content management facility 350 and/or one or more other facilities may be implemented as one or more software applications embodied on a computer-readable medium such as storage facility 330 and configured to direct processing facility 320 of the access subsystem 120 to execute one or more of the processes described herein.

Communication facility 310 may be configured to communicate with content management subsystem 110 (e.g., over network 225), including sending and receiving data representative of content, data associated with content (e.g., metadata and key data), content management commands, and/or other communications to/from content management subsystem 110. Communication facility 310 may include any device, logic, and/or other technologies suitable for transmitting and receiving such data. In certain embodiments, communication facility 310 may be configured to support other network service communications over network 225, including wireless voice, data, and messaging service communications, for example. Communication facility 310 may be configured to interface with any suitable communication media, protocols, formats, platforms, and networks, including any of those mentioned herein.

Processing facility 320 may be configured to execute and/or direct execution of operations of one or more components of the access subsystem 120. Processing facility 320 may direct execution of operations in accordance with computer-executable instructions such as may be stored in storage facility 330 or another computer-readable medium. As an example, processing facility 320 may be configured to process content, including demodulating, decoding, and parsing received content, and encoding and modulating content for transmission to content management subsystem 110.

Storage facility 330 may include one or more data storage media, devices, or configurations and may employ any type, form, and combination of storage media. For example, the storage facility 330 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Data, including data representative of content and/or content metadata (e.g., one or more content instances), may be temporarily and/or permanently stored in the storage facility 330.

I/O facility 340 may be configured to receive user input and provide user output and may include any hardware, firmware, software, or combination thereof supportive of input and output capabilities. For example, I/O facility 340 may include one or more devices for capturing or otherwise creating content, including, but not limited to, a still-shot camera, video camera, scanner, microphone, keyboard or keypad, touch screen component, and/or receiver (e.g., an RF or infrared receiver). Accordingly, a user 230 of access subsystem 120 may create or otherwise acquire content (e.g., by taking a picture, creating a word processing document, or downloading a data file) and provide the content to content management subsystem 110, as described below.

I/O facility 340 may include one or more devices for presenting content for experiencing by the user 230, including, but not limited to, a graphics engine, a display, one or more display drivers, one or more audio speakers, and one or more audio drivers. Accordingly, I/O facility 340 may present content (e.g., play back and/or display) for experiencing by the user 230. I/O facility 340 may also be configured to provide other output for the user 230, such as graphical user interfaces.

Content management facility 350 may be configured to provide one or more tools for management of content. The tools may include or be provided using hardware, computer-readable instructions embodied on a computer-readable medium such as storage facility 330, or a combination of hardware and computer-readable instructions. In certain embodiments, content management facility 350 may be implemented as a software application embodied on a computer-readable medium such as storage facility 330 and configured to direct the processing facility 320 of the access subsystem 120 to execute one or more of the content management operations described herein.

The tools may be configured to enable user 230 to create, format, modify, delete, annotate (e.g., edit, rate, label, add a note to, comment about, and categorize content), access, retrieve, copy, move, send, request, receive, decrypt, and/or otherwise manage content stored within access subsystem 120 and/or content management subsystem 110. For example, a user 230 utilizing the content management tools may create and provide a content instance to content management subsystem 110. Through content management facility 350, the user 230 may access and manage the content instance. Content management facility 350 may generate and provide content management commands to content management subsystem 110, which may be configured to receive and process the commands, and to identify and perform appropriate content management operations based on the commands. Content management commands may include instructions to store, transmit, share, recommend, modify, delete, annotate, access, retrieve, download, copy, move, and/or perform any other operations on content.

In some examples, the one or more tools provided by content management facility 350 may include one or more application clients configured to facilitate access to content stored within or received from content management subsystem 110. Exemplary application clients may include, but are not limited to, image viewers, media players, and/or document readers and editors.

In some examples, as will be described in more detail below, content management facility 350 is configured to facilitate access to encrypted content by directing processing facility 320 to execute one or more of the decryption operations described herein. For example, content management facility 350 may be configured to direct processing facility 320 to download or otherwise access a key associated with an encrypted content instance from content management subsystem 110. Content management facility 350 may then direct processing facility 320 to decrypt the encrypted content instance using the acquired key. Decryption of encrypted content instances will be described in more detail below.

Metadata facility 360 may be configured to perform operations associated with content metadata, including generating, updating, and providing content metadata. The term "metadata" as used herein refers generally to any electronic data descriptive of content and/or content instances. For example, metadata may include, but is not limited to, content instance identifiers (e.g., file names), time data, location data, user data, source data, destination data, size data, creation data, modification data, data structure data, and access data descriptive of content and/or one or more content instances. Examples of metadata may include time data associated with a data operation (e.g., creating, modifying, deleting, receiving, or sending content), location data associated with a data operation (e.g., a geographic or network location at which content is created), user data identifying one or more users associated with content (e.g., a user who created, modified, deleted, sent, received, accessed, or otherwise operated on or is owner of content), content type information (e.g., file type or other predefined category of content), content transport information, source data associated with a source of content (e.g., a user from whom content is received), and destination data associated with a destination to which content is sent (e.g., a user to whom content is transmitted).

Metadata facility 360 may include hardware, computer-readable instructions embodied on a computer-readable medium such as storage facility 330 (e.g., one or more content management software applications), or a combination of hardware and computer-readable instructions. In certain embodiments, metadata facility 360 may be implemented as a software application embodied on a computer-readable medium such as storage facility 330 and configured to direct the processing facility 320 of the access subsystem 120 to execute one or more of metadata operations described herein.

Metadata facility 360 may be configured to detect content management operations and to generate, update, delete, and/or provide metadata associated with the operations. For example, if a content instance is transmitted to a destination, such as by transmitting data representative of the content instance over network 225, metadata facility 360 may detect the transmission of the content instance and generate and provide metadata indicating a time at which the content instance is sent and the destination to which the content instance is sent (e.g., a user or remote device identifier). Similarly, if another content instance is received by access subsystem 120 from a source (e.g., content management subsystem 110), metadata facility 360 may detect the receipt of the other content instance and generate and provide metadata indicating a time at which the other content instance is received and the source that provided the other content instance.

In some examples, metadata facility 360 may provide content metadata to content management subsystem 110 or to content management facility 350, which may be configured to associate the content metadata with the corresponding content and provide the content and/or content metadata to content management subsystem 110. Content management subsystem 110 may be configured to maintain and utilize the content metadata to identify relationships between content instances, and to utilize the relationships to identify and retrieve related content.

Figure 4:
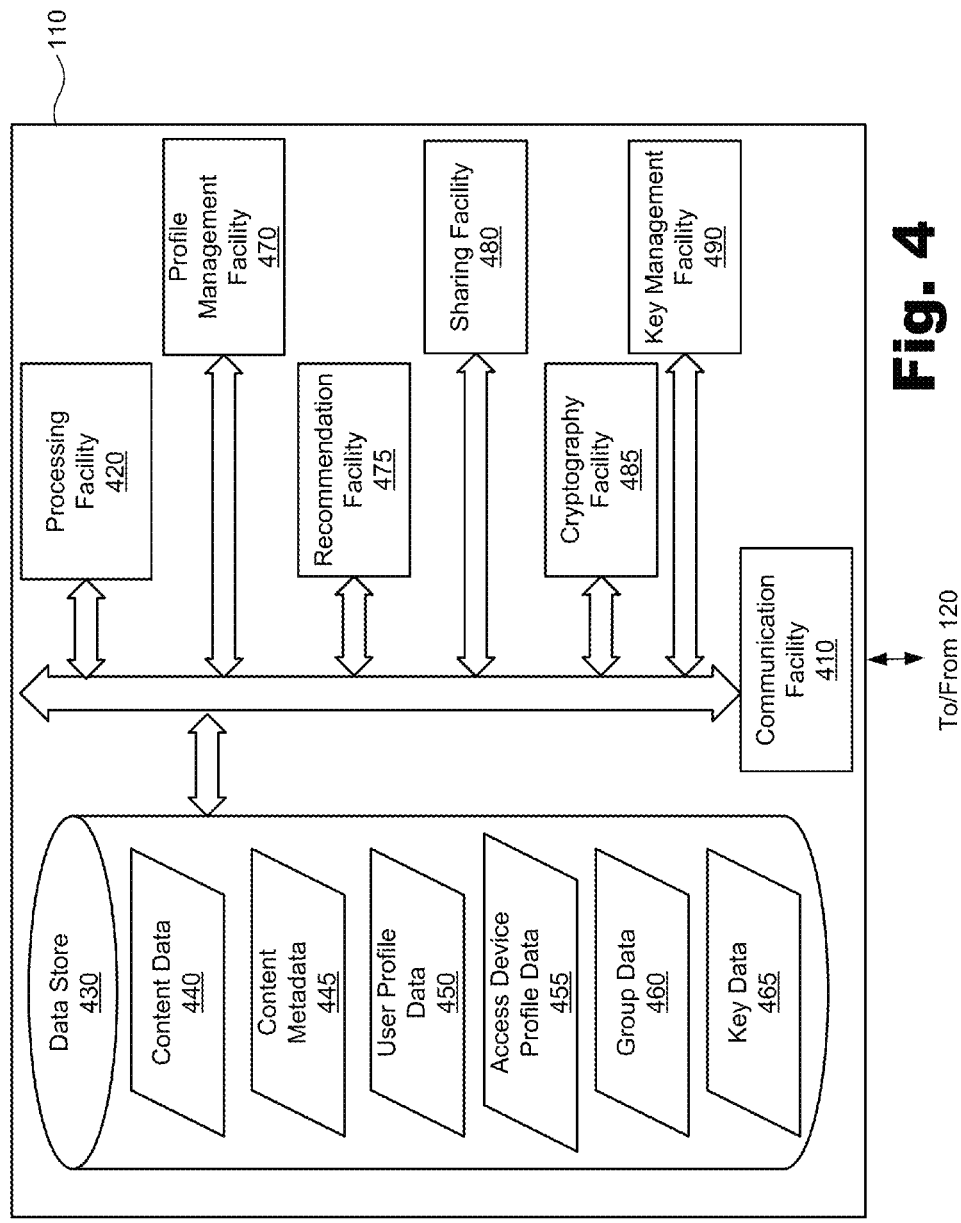
FIG. 4 illustrates an exemplary content management subsystem according to principles described herein.

FIG. 4 illustrates an exemplary content management subsystem 110. The components of content management subsystem 110 may include or be implemented as hardware, computing instructions (e.g., software) embodied on a computer-readable medium, or a combination thereof. In certain embodiments, for example, one or more components of content management subsystem 110 may include or be implemented on one or more servers, such as server 210, configured to communicate over network 225. While an exemplary content management subsystem 110 is shown in FIG. 4, the exemplary components illustrated in FIG. 4 are not intended to be limiting. Indeed, additional or alternative components and/or implementations may be used.

As shown in FIG. 4, content management subsystem 110 may include a communication facility 410, which may be configured to communicate with access subsystem 120, including receiving data representative of content, data associated with content (e.g., metadata), and content data operations from access subsystem 120 and/or any other device or subsystem. Communication facility 410 may additionally or alternatively be configured to transmit content, data associated with content (e.g., a key), and/or any other data to access subsystem 120 and/or any other device or subsystem by way of network 225. The communication facility 410 may include and/or support any suitable communication platforms and technologies for communicating with and transporting content and associated data to/from access subsystem 120. Communication facility 410 may be configured to support a variety of communication platforms, protocols, and formats such that content management subsystem 110 can receive content from and distribute content to a variety of computing platforms (e.g., a mobile telephone service platform, a web-based platform, a subscriber television platform, etc.) using a variety of communications technologies. Accordingly, the content management subsystem 110 may be configured to support a multi-platform system in which content can be received from and provided to diverse platforms.

Content management subsystem 110 may include a processing facility 420 configured to control operations of components of the content management subsystem 110. Processing facility 420 may execute or direct execution of operations in accordance with computer-executable instructions stored to a computer-readable medium such as a data store 430. As an example, processing facility 420 may be configured to process (e.g., encode, decode, modulate, and/or demodulate) content, data associated with content (e.g., metadata), and/or communications received from or to be transmitted to access subsystem 120. As another example, processing facility 420 may be configured to perform data management operations on data stored in data store 430, including any of the content management operations described above. For example, processing facility 420 may operate on content data 440, including storing content data 440 to data store 430 as shown in FIG. 4 and indexing, searching, accessing, retrieving, modifying, annotating, backing up, encrypting, encoding, decrypting, decoding, copying, and/or deleting content data 440.

In some examples, processing facility 420 may be configured to perform device-specific content formatting before content is provided to (e.g., downloaded by) a particular access device 220. In this manner, the content may be optimally viewed or otherwise experienced by a user of the access device 220.

Data store 430 may include one or more data storage media, devices, or configurations and may employ any type, form, and combination of storage media. For example, the data store 430 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Data store 430 may store any suitable type or form of electronic data, including content data 440, content metadata 445, user profile data 450, access device profile data 455, group data 460, and/or key data 465.

Content data 440 may include or be stored within one or more content instances. Content metadata 445 may include metadata associated with one or more of the content instances. In some examples, content data 440 and/or content metadata 445 is encrypted. Encryption of content data 440 may be performed using any suitable encryption process or processes as may serve a particular application. For example, content data 440 may be encrypted with 128 bit, 256 bit encryption, and/or any other type of encryption. Content data 440 may be encrypted with one or multiple layers of encryption. Encryption of content data 440 may prevent, or at least deter, unauthorized access to the content data 440, as will be described in more detail below.

User profile data 450 may include any information descriptive of one or more users who are associated with access subsystem 120 or who receive services provided over network 225. User profile data 450 may include user authentication information, user identifiers, information about one or more access devices 120 that correspond with a user, user preferences, and/or any other information related to one or more users. User profile data 450 will be described in more detail below.

Access device profile data 455 may include any information descriptive of access subsystem 120 and/or any access device 220 configured to communicate with content management subsystem 110. For example, access device profile data 455 may include data representative of one or more access device identifiers, network addresses (e.g., internet protocol ("IF") addresses), network resources, computing resources, subscription information, device permissions, platforms, etc. Access device profile data 455 will be described in more detail below.

Group data 460 may include any information that can be used to identify groupings of users 230 and/or access devices 220. For example, group data 460 may include information indicating that certain users 230 are members of a group. Accordingly, group data 460 may be useful for facilitating selective access of content data 440 by users 230 within a group. In certain embodiments, group data 460 may include information that can be used to access user profile data 450 corresponding to users in a group, and the user profile data 450 may include information that can be used to identify user associations with access devices 120.

Group data 460 may be defined in any suitable manner, including users (e.g., a subscription account owner) defining groups and providing data representative of the defined groups to content management subsystem 110. In certain embodiments, at least certain groups are defined based on user subscription accounts for services provided over network 225. For example, a default group may be defined by content management subsystem 110 to include any users associated with a subscription account (e.g., a network data storage account).

Key data 465 may include data representative of one or more keys configured to facilitate one or more cryptographic operations on content data 440. As used herein, a "key" refers to data (e.g., a text string, a sequence of random or pseudo-random bits, or any other data) that determines the functional output of a cryptographic operation. In encryption, for example, a key specifies or facilitates a particular transformation of unencrypted content data into encrypted content data.

In decryption, a key specifies or facilitates a transformation of encrypted content data into decrypted content data. Key data 465 may include any type of key (e.g., a private key or a public key) and may be generated using any cryptographic process, algorithm, or heuristic as may serve a particular application. Keys will be described in more detail below.

In certain embodiments, data 440-465 may be stored using one or more suitable data entities and/or structures, including one or more relational or hierarchical data tables, for example.

Content management subsystem 110 may include a profile management facility 470, which may be configured to manage one or more user profiles and/or access device profiles and/or maintain a database of permissions associated therewith. For example, profile management facility 470 may be configured to facilitate updating of a user profile and/or an access device profile by a user. Additionally or alternatively, profile management facility 470 may be configured to process a user profile and/or an access device profile in the context of a user requesting access to content stored within data store 430 and determine, based on the user profile and/or access device profile, whether the user should be granted access to the content.

Content management subsystem 110 may further include a recommendation facility 475, which may be configured to identify one or more relationships between content instances, and, based on those relationships, provide one or more content recommendations to one or more users. Recommendation facility 475 may include or be implemented as hardware, computing instructions (e.g., software) tangibly embodied on a computer-readable medium, or a combination of hardware and computing instructions configured to perform one or more of the processes described herein. In certain embodiments, recommendation facility 475 may be implemented as a software application embodied on a computer-readable medium such as data store 430 and configured to direct the processing facility 420 to execute one or more of the processes described herein.

Content management subsystem 110 may further include a sharing facility 480, which may be configured to facilitate and manage sharing of content between different users 230 and/or access devices 220. Sharing facility 480 may include or be implemented as hardware, computing instructions (e.g., software) tangibly embodied on a computer-readable medium, or a combination of hardware and computing instructions configured to perform one or more of the processes described herein. In certain embodiments, sharing facility 480 may be implemented as a software application embodied on a computer-readable medium such as data store 430 and configured to direct the processing facility 420 to execute one or more of the processes described herein.

Content management subsystem 110 may further include a cryptography facility 485, which may be configured to facilitate encryption and/or decryption of content data 440, key data 465, and/or any other data as may serve a particular application. Cryptography facility 485 may include or be implemented as hardware, computing instructions (e.g., software) tangibly embodied on a computer-readable medium, or a combination of hardware and computing instructions configured to perform one or more of the processes described herein. In certain embodiments, cryptography facility 485 may be implemented as a software application embodied on a computer-readable medium such as data store 430 and configured to direct the processing facility 420 to execute one or more of the processes described herein.

In some examples, cryptography facility 485 may be configured to direct processing facility 420 to encrypt content using any suitable encryption process or heuristic. To illustrate, content that is to be stored and managed by content management subsystem 110 may be encrypted with multiple layers of encryption. When this content is to be transmitted to an access device 220, cryptography facility 485 may be configured to decrypt the content using any suitable decryption process or heuristic. One or more layers of encryption may be applied to content automatically by cryptography facility 485.

An additional or alternative layer of encryption may be applied to content in response to a command initiated by a user 230 associated with the content. For example, a user-initiated encryption command may be received by content management subsystem 110 and cryptography facility 485 may, in response to the command, encrypt a content instance using a key. The user 230 may manage access to the encrypted content instance by controlling access to the key, as will be described in more detail below.

Content management subsystem 110 may further include a key management facility 490, which may be configured to facilitate management of one or more keys associated with encrypted content. Key management facility 490 may include or be implemented as hardware, computing instructions (e.g., software) tangibly embodied on a computer-readable medium, or a combination of hardware and computing instructions configured to perform one or more of the processes described herein. In certain embodiments, key management facility 490 may be implemented as a software application embodied on a computer-readable medium such as data store 430 and configured to direct the processing facility 420 to execute one or more of the processes described herein.

In some examples, key management facility 490 may be configured to generate, store, transmit, facilitate access to, and/or otherwise process one or more keys associated with encrypted content. In some examples, key management facility 490 is configured to manage keys in accordance with one or more access rules associated with the encrypted content. An "access rule" may specify or define one or more permissions, conditions, associations, and/or other factors that are to be complied with in order for a user to have access to a key configured to facilitate decryption of an encrypted content instance. Exemplary access rules will be described in more detail below.

As mentioned, content management subsystem 110 may be configured to support communication with access subsystem 120 via multiple network platforms. For example, user 230 may utilize multiple access devices 220, each a part of a different network platform, to provide and/or access content stored within content management subsystem 110.

Figure 5:
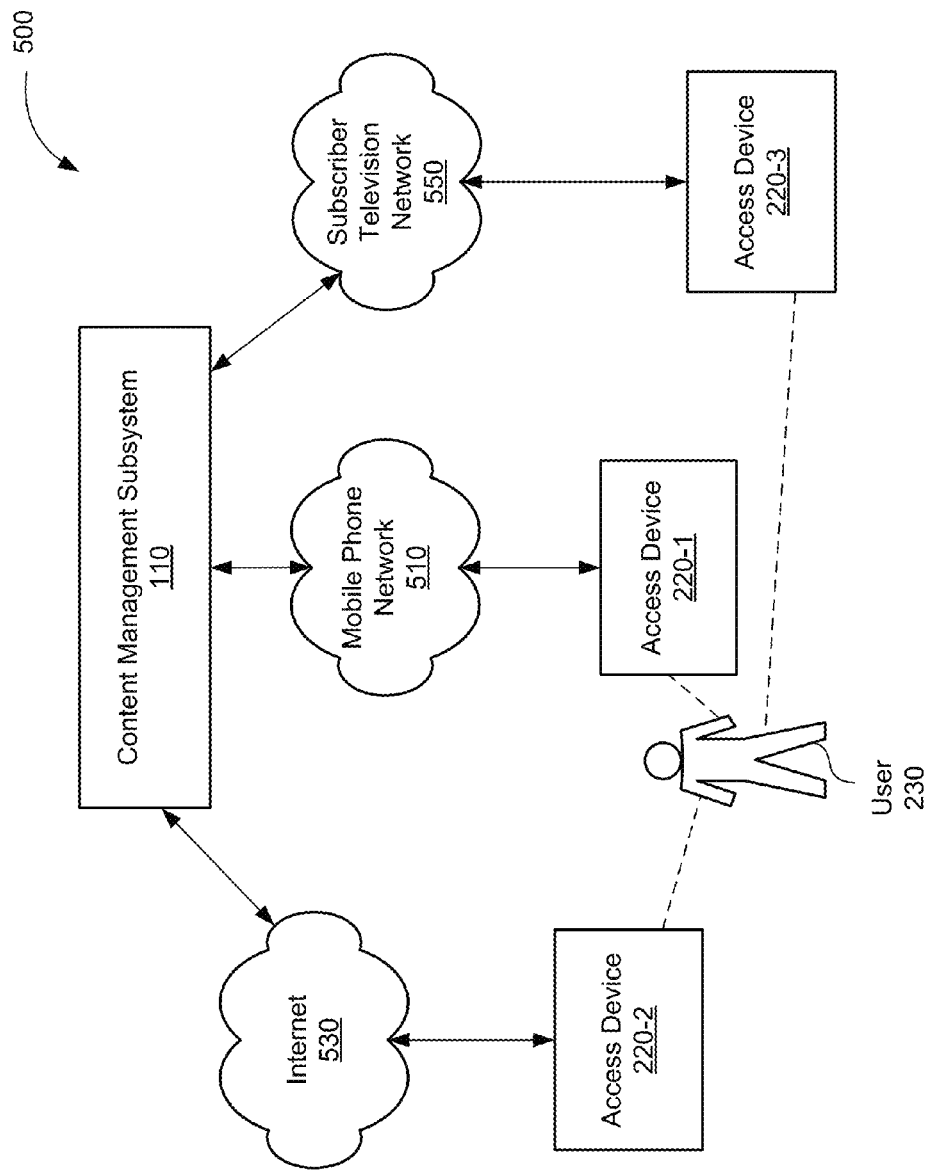
FIG. 5 shows an exemplary implementation of the system of FIG. 1 according to principles described herein.

To illustrate, FIG. 5 shows an exemplary implementation 500 of system 100. As shown in FIG. 5, the implementation 500 may include content management subsystem 110 and access devices 220-1 through 220-3 (collectively referred to herein as "access devices 220") associated with user 230. Content management subsystem 110 may be configured to communicate with each access device 220 over a different network platform. For example, content management subsystem 110 may be configured to communicate with access device 220-1 (e.g., a mobile phone) over a mobile phone network 510, with access device 220-2 (e.g., a personal computer) over the Internet 530, and/or with access device 220-3 (e.g., a set-top box) over subscriber television network 550. Hence, user 230 may be able to utilize any of the access devices 220-1 through 220-3 to provide and/or access content stored within content management subsystem 110. It will be recognized that mobile phone network 510, the Internet 530, and subscriber television network 550 may be part of network 225 shown in FIG. 2. It will also be recognized that the networks shown in FIG. 5 are merely illustrative of the many different types of networks that may facilitate communication between content management subsystem 110 and access subsystem 120.

Figure 6:
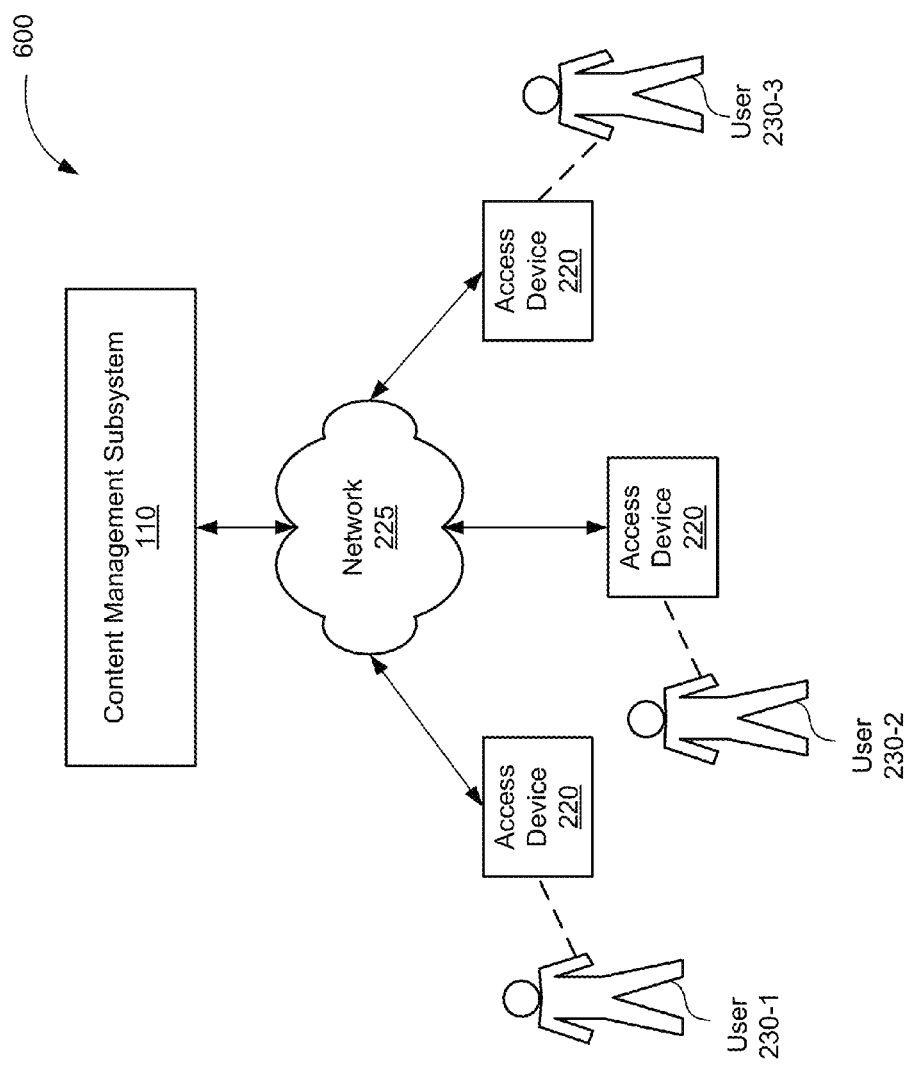
FIG. 6 shows an exemplary implementation of the system of FIG. 1 wherein multiple users may utilize one or more access devices to communicate with a content management subsystem over a network according to principles described herein.

Content management subsystem 110 may be configured to support interaction with multiple users. For example, FIG. 6 shows an exemplary implementation 600 of system 100 wherein multiple users 230-1 through 230-3 (collectively referred to herein as "users 230") may utilize one or more access devices 220 to communicate with content management subsystem 110 over network 225. Each user 230 may provide and/or access content stored within content management subsystem 110 via one or more of the access devices 220. In this manner, as will be described in more detail below, content may be shared between multiple users 230.

In some examples, a user 230 may direct content management subsystem 110 to encrypt content before the content is shared with other users 230. The user 230 may control access to the encrypted content by specifying one or more access rules that other users and/or access devices 230 are to comply with in order to gain access to a key required to decrypt the encrypted content.

To illustrate, FIGS. 7A-7E show an exemplary sequence of communications that may occur between content management subsystem 110 and access devices 220-1 and 220-2 when user 230-1 instructs content management subsystem 110 to encrypt a content instance and user 230-2 requests access to the encrypted content instance. The communications illustrated in FIGS. 7A-7E are shown to be transmitted over network 225 for illustrative purposes only. It will be recognized that one or more of the communications may additionally or alternatively be transmitted directly between content management subsystem 110 and access devices 220-1 and 220-2. It will also be recognized that additional or alternative communications may occur between content management subsystem 110 and access devices 220-1 and 220-2 as may serve a particular application.

Figure 7A:
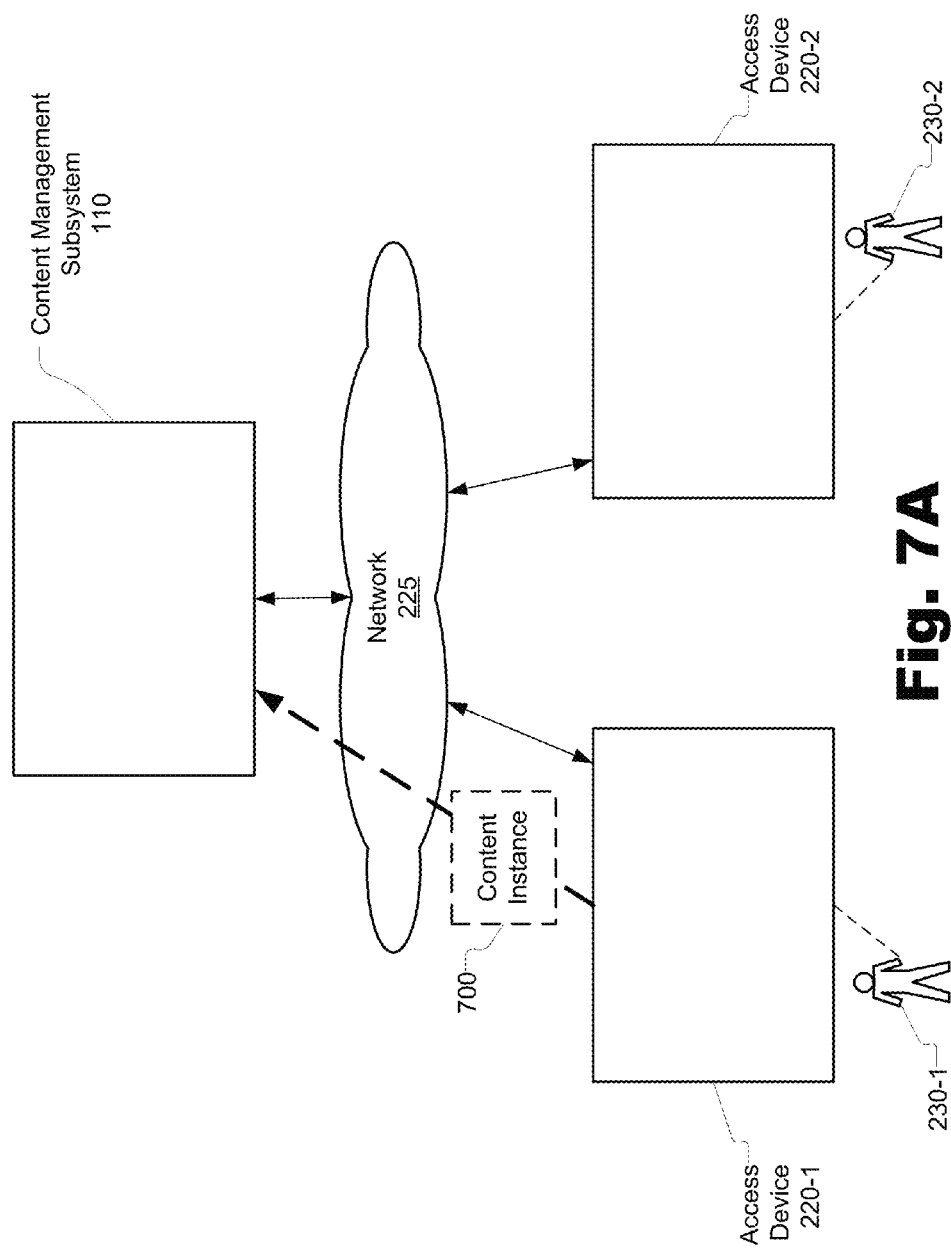

As shown in FIG. 7A, data representative of a content instance 700 may be transmitted from access device 220-1 to content management subsystem 110. In some examples, the data representative of the content instance 700 may include a copy of a content instance created, acquired by, or otherwise being stored within access device 220-1. The content management subsystem 110 may be configured to store content instance 700 within data store 430 as content data 440.

User 230-1 may then initiate transmission of data representative of an encryption command 710 to content management subsystem 110, as shown in FIG. 7B. The encryption command 710 is configured to instruct content management subsystem 110 to encrypt the content instance 700 using any suitable encryption process or heuristic. The resultant encrypted content instance 720 may be stored within data store 430.

During the encryption process, a key 730 may be generated and/or used by content management subsystem 110. The key 730 may be configured to facilitate decryption of the encrypted content instance 720. Key 730 may be stored within data store 430 as key data 465.

Figure 7C:
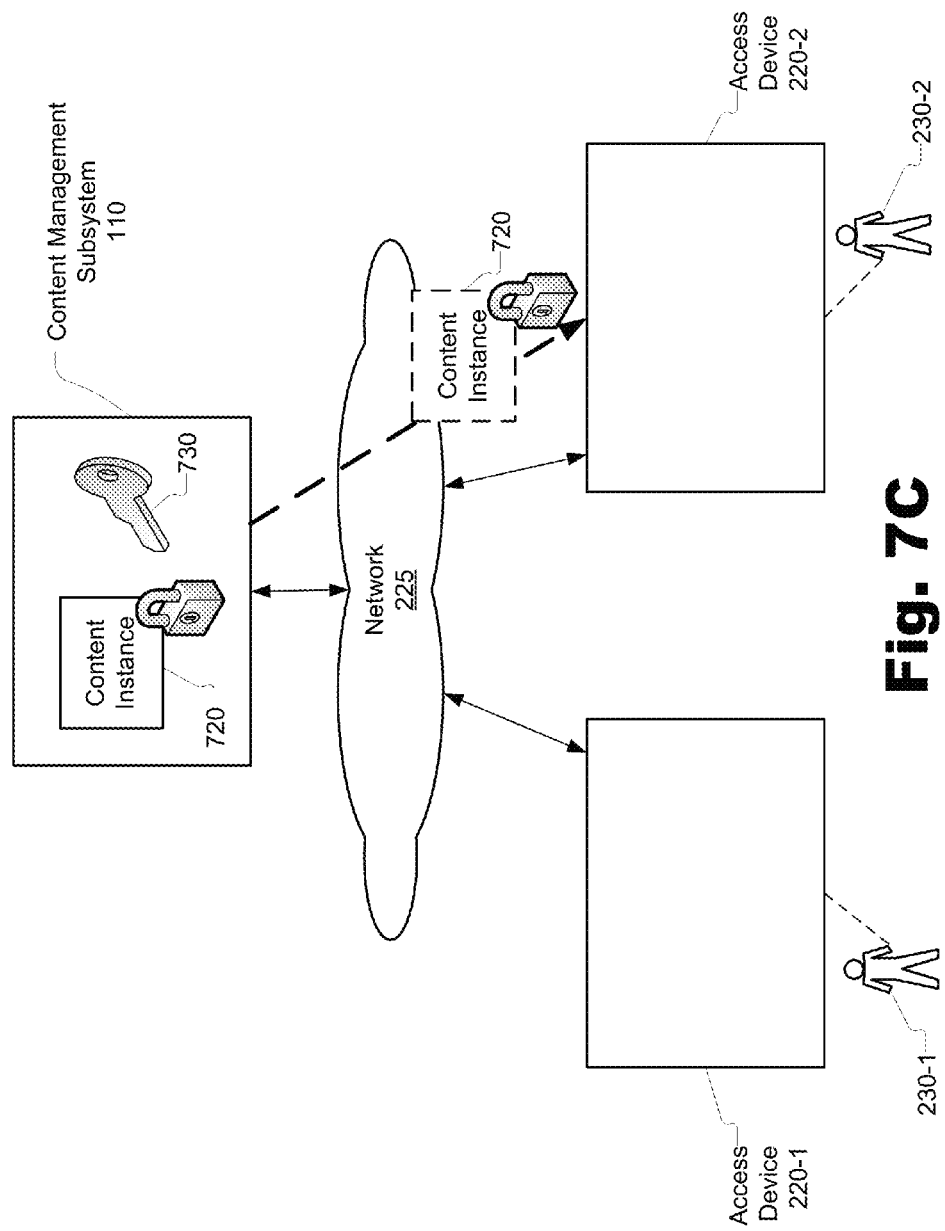

In some examples, a user 230-2 of access device 220-2 may transmit a request to content management subsystem 110 to access the encrypted content instance 720. In response, data representative of the encrypted content instance 720 may be transmitted to access device 220-2, as shown in FIG. 7C. The encrypted content instance 720 may then be stored within access device 220-2. In some examples, the data representative of the encrypted content instance 720 may include a copy of the encrypted content instance 720 stored within content management subsystem 110 or the encrypted content instance 720 itself. While data representative of the encrypted content instance 720 is shown to be transmitted to access device 220-2, it will be recognized that access device 220-2 may be configured to access the encrypted content instance 720 while the encrypted content instance 720 resides within content management subsystem 110.

Figure 7D:
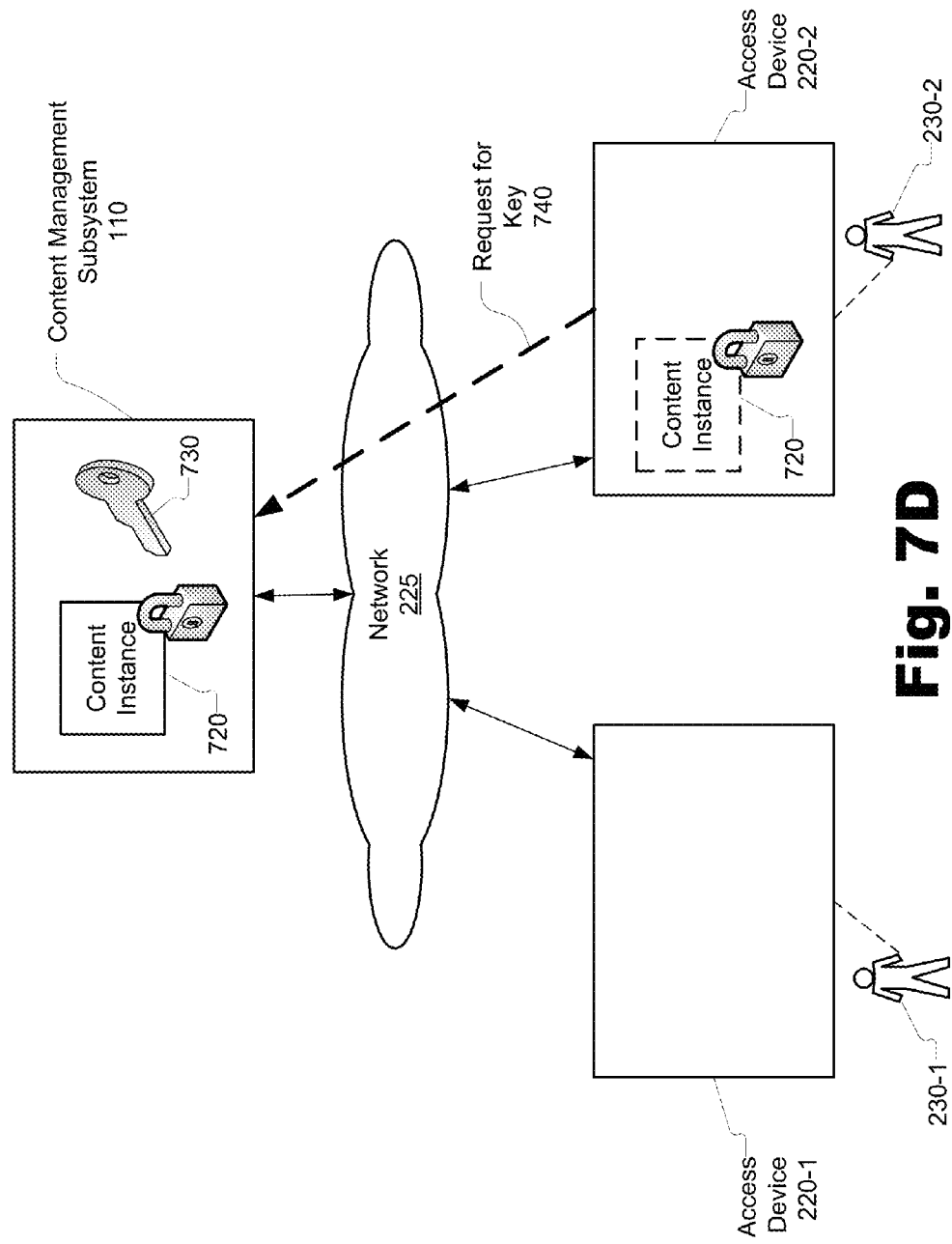

FIG. 7D shows the encrypted content instance 720 residing within access device 220-2. To access the encrypted content instance 720, access device 220-2 must decrypt the encrypted content instance 720. To this end, when an attempt to access the encrypted content instance 720 residing in access device 220-2 is detected, access device 220-2 may transmit data representative of a request 740 for key 730 to content management subsystem 110, as shown in FIG. 7D.

Content management subsystem 110 may be configured to process request 740 and perform a predefined action related to key 730 in accordance with at least one access rule. The at least one access rule may be based on one or more user profiles and/or access device profiles. For example, an access rule may specify that user 230-2 may have read-only access to encrypted content instance 720. Alternatively, an access rule may specify that user 230-2 may not access encrypted content instance 720. Additional access rules will be described in more detail below.

Figure 7E:
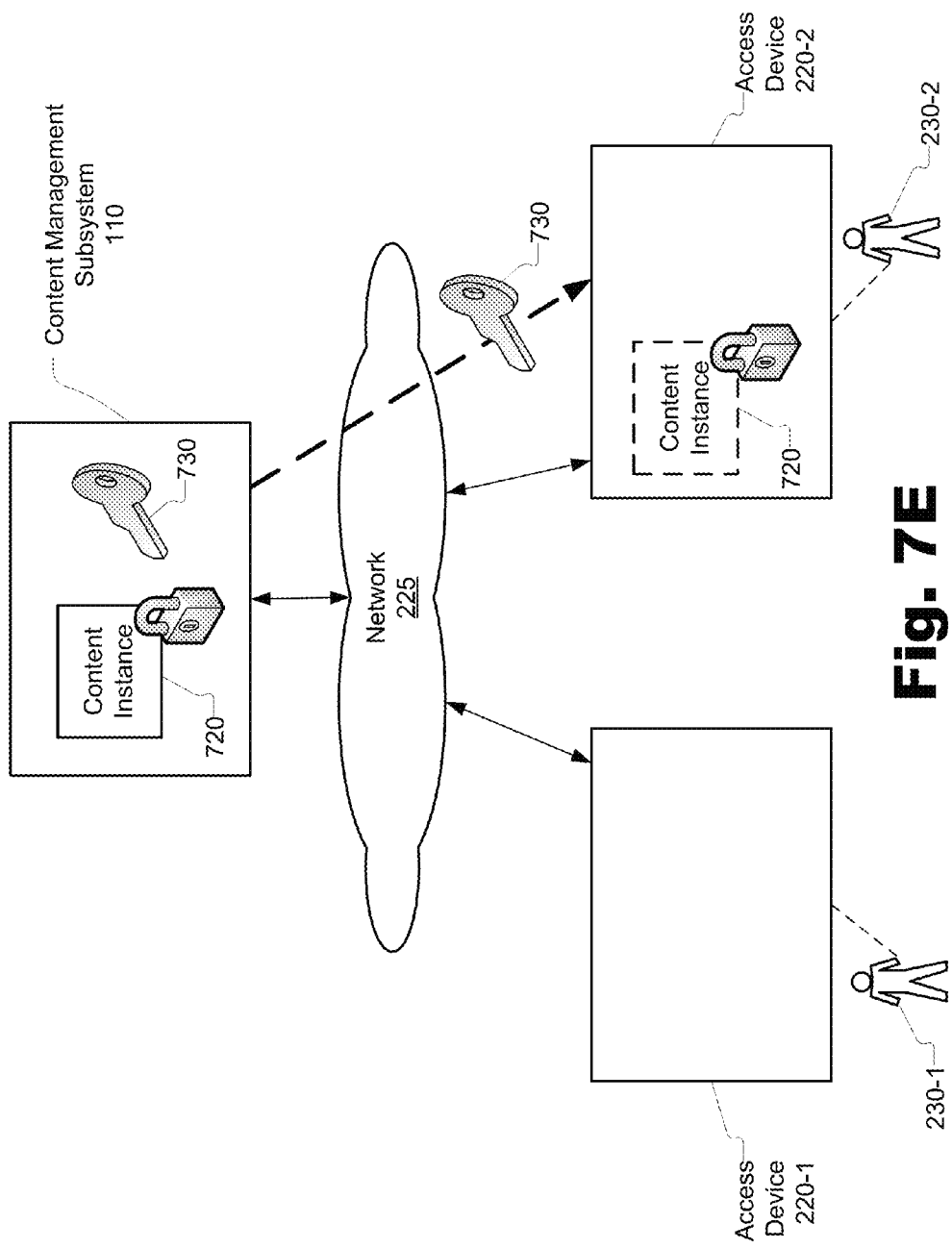

The predefined action performed by content management subsystem 110 may be selected in accordance with the access rule(s) associated with the encrypted content instance 720. For example, if an access rule specifies that user 230-2 may have read-only access to encrypted content instance 720, the predefined action may include transmitting data representative of key 730 to access device 220-2 as shown in FIG. 7E so that access device 220-2 may use the key 730 to decrypt and have read-only access to the encrypted content instance 720. Alternatively, if an access rule specifies that user 230-2 may not access encrypted content instance 720, the predefined action may include not transmitting or preventing transmission of the key 730 to access device 220-2. In this manner, user 230-2 may be prevented from decrypting and accessing encrypted content instance 720. Other predefined actions that may be performed by content management subsystem 110 will be described in more detail below.

In some examples, access device 220-2 may be configured to automatically delete key 730 and any data representative thereof after key 730 has been used to decrypt the encrypted content instance 720. In this manner, key 730 may not be copied, transmitted, or otherwise misappropriated. Any suitable method or heuristic may be used to ensure that key 730 is not used in an unauthorized manner. If user 230-2 desires to again access encrypted content instance 720, he or she may be required to submit another request 740 for key 730 to content management subsystem 110. Hence, in some configurations, a connection to network 225 is required to decrypt and access the encrypted content instance 720.

Figure 8:
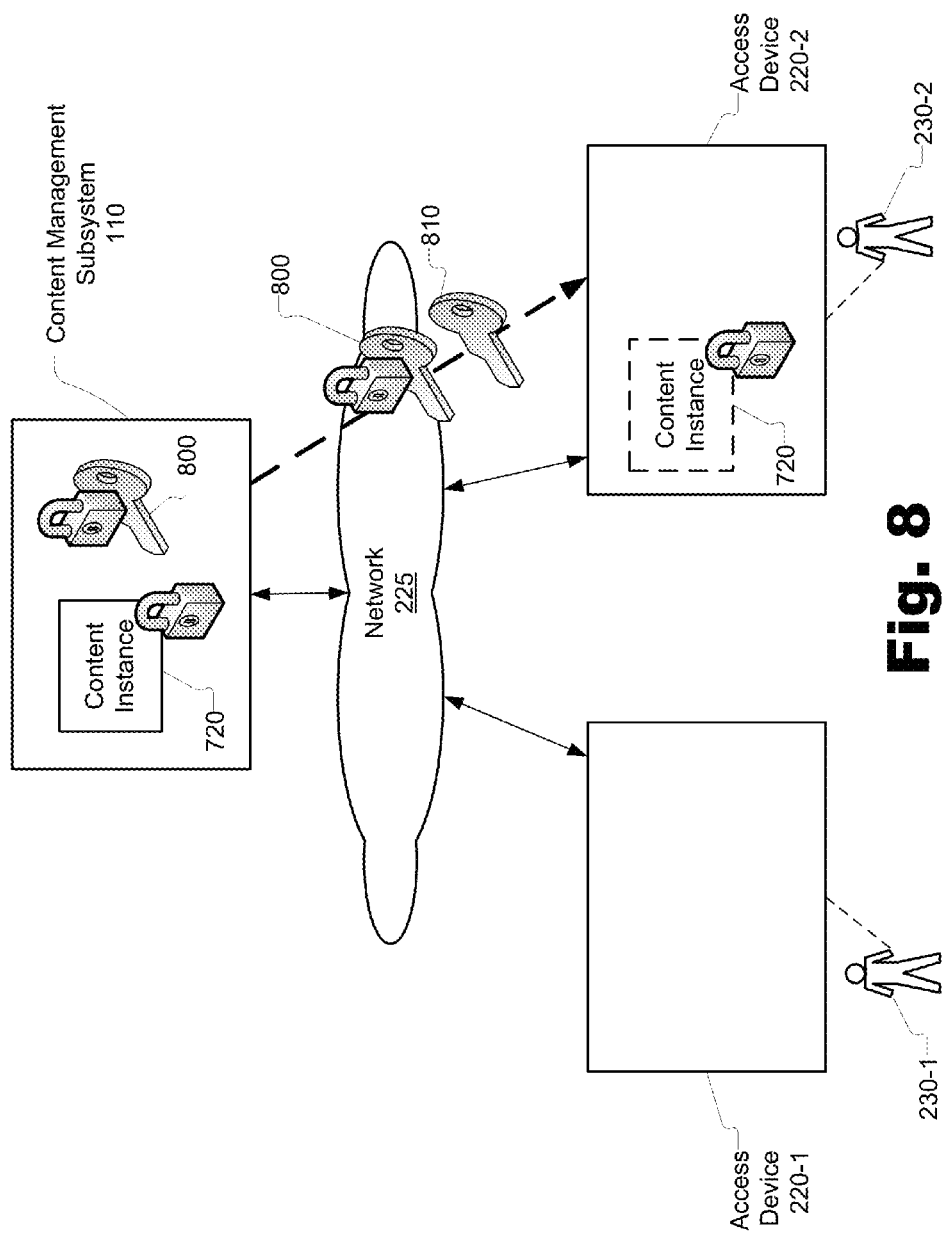
FIG. 8 illustrates a configuration wherein a key is encrypted by a content management subsystem and stored therein as an encrypted key according to principles described herein.

In some instances, an additional level of security may be provided by encrypting key 730 before the key 730 is transmitted to access device 220-2. For example, FIG. 8 illustrates a configuration wherein key 730 is encrypted by content management subsystem 110 and stored therein as an encrypted key 800. Encrypted key 800 along with a key 810 configured to facilitate decryption of encrypted key 800 may be transmitted to access device 220-2 in response to request 740, as shown in FIG. 8. Access device 220-2 may then use key 810 to access key 730 by decrypting encrypted key 800. Key 730 may then be used to decrypt the encrypted content instance 720 as described above.

In some examples, the key 730 may be encrypted each time a request 740 for the key 730 is transmitted to content management subsystem 110. In this manner, the same encrypted key 800 will never be transmitted to an access device 230 more than once. Accordingly, a key 810 will only be viable for decrypting one encrypted key 800, and cannot be reused to decrypt other encrypted keys 800. Hence, key 810 may be referred to as a single-use key in some embodiments. By requiring a different key 810 to decrypt encrypted key 800 each time encrypted key 800 is transmitted to an access device 220, unauthorized access to key 730 may be mitigated or prevented.

In some examples, access subsystem 120 may be configured to generate and provide one or more GUIs to a display for presentation to one or more users in order to facilitate management of content and keys stored within content management subsystem 110, creation of one or more access rules corresponding to encrypted content stored within content management subsystem 110, customization of one or more user profiles and/or access devices profiles, and/or access to content stored within content management subsystem 110. In some examples, one or more of the GUIs is generated in accordance with instructions and/or includes data provided by content management subsystem 110.

Exemplary GUIs that may be generated by access subsystem 120 will now be described in connection with FIGS. 9-13. It will be recognized that the GUIs shown and described herein are merely illustrative and that they may be modified, added to, or otherwise changed as may serve a particular application. For example, the layout and/or contents of the GUIs may be modified to conform to the processing and viewing requirements of different access devices 220.

Figure 9:
FIG. 9 shows a graphical user interface ("GUI") having a number of input fields that may be configured to facilitate entry of personal data associated with a particular user profile according to principles described herein.
Figure 10:
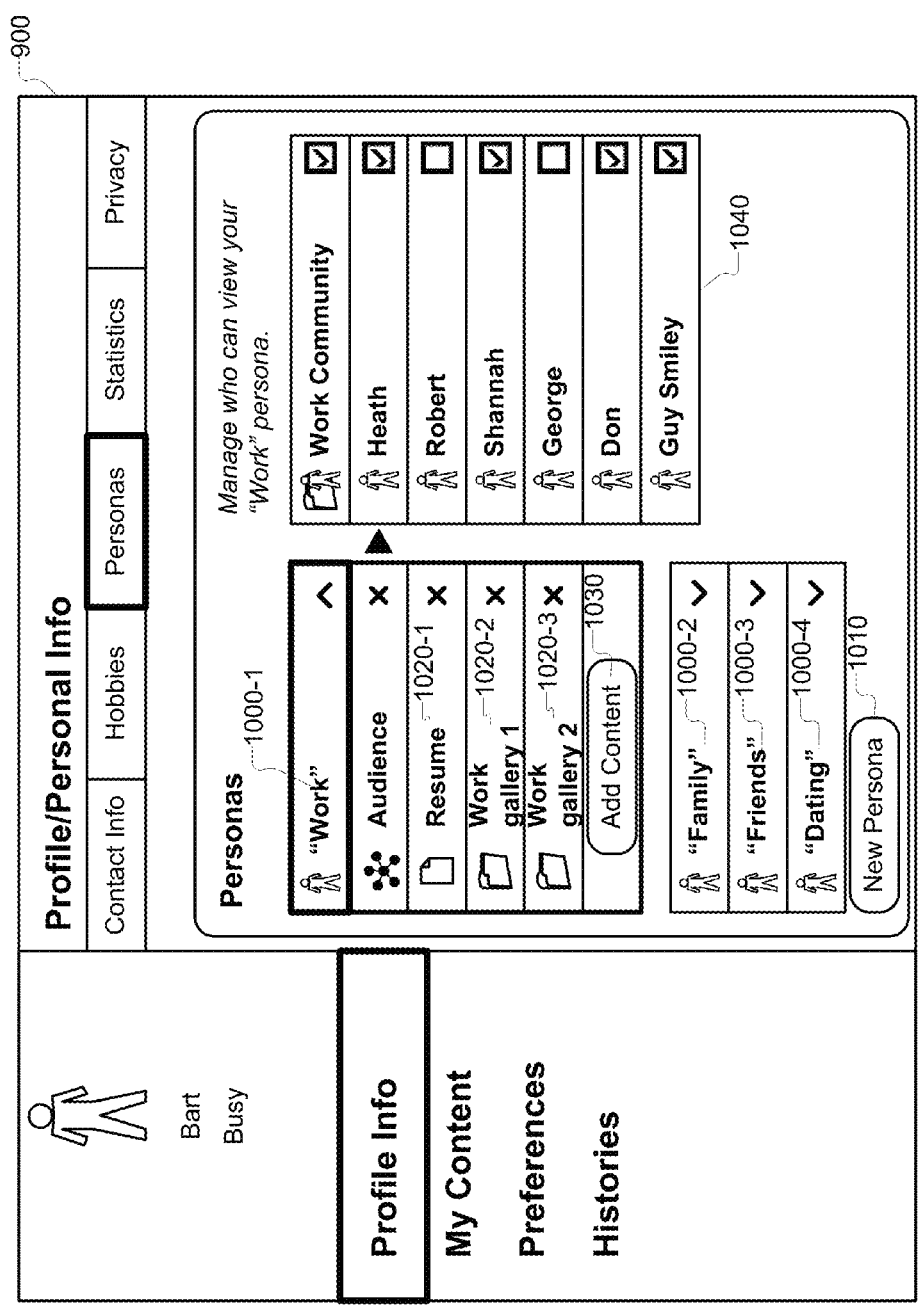
FIG. 10 shows that the GUI of FIG. 9 may be configured to facilitate management of one or more personas within a user profile according to principles described herein.

FIGS. 9-10 show an exemplary GUI 900 that may be displayed by access subsystem 120 to facilitate management of a user profile. As shown in FIGS. 9-10, GUI 900 may include a combination of graphics, text, input fields, and/or other information configured to facilitate creation, editing, and/or managing of one or more user profiles. To illustrate, FIG. 9 shows a number of input fields 910 that may be displayed and configured to facilitate entry of personal data associated with a particular user profile. Other customizable attributes associated with a user profile may include, but are not limited to, a user name 920, a user status 930, a user picture 940, and/or any other attribute as may serve a particular application.

In some examples, a user may have multiple "personas" within a user profile. Each "persona" may represent a certain set of characteristics, attributes, and/or preferences corresponding to the user. For example, a user may desire to have a "work" persona, a "family" persona, a "friends" persona, a "dating" persona, etc. In certain embodiments, a user may allow other users or groups of users to only have access to content associated with a certain persona and/or or otherwise view or interact with the specified persona. In this manner, a user may have a single user profile associated with content management subsystem 110 while still being able to represent himself or herself to other users of content management subsystem 110 in different ways. For example, a user may configure profile settings such that a certain content instance or type of content instance is available through a first user persona (e.g., a "family" persona) but is not available through another user persona (e.g., a "work" persona).

FIG. 10 shows that GUI 900 may be configured to facilitate management of one or more personas within a user profile. As shown in FIG. 10, the GUI 900 may include a list of personas 1000-1 through 1000-4 (collectively referred to herein as "personas 1000") associated with a user profile corresponding to a user of access subsystem 120. The list of personas 1000 shown in FIG. 10 is merely illustrative of the many different personas that may be associated with a user profile. It will be recognized that a user may add, edit, and/or remove a persona from a user profile as desired. For example, to add a new persona to a user profile, the user may select a "new persona" button 1010.

In some examples, GUI 900 may be configured to facilitate association of one or more content instances with a particular persona 1000. For example, FIG. 10 shows that a number of content instances 1020-1 through 1020-3 (e.g., a "resume" document, a "work gallery 1" collection of content instances, and a "work gallery 2" collection of content instances) are associated with "work" persona 1000-1. In some examples, an "add content" button 1030 may be selected in order to associate one or more content instances with persona 1000-1. It will be recognized that content may be associated with more than one persona and/or with the user profile in general as may serve a particular application.

GUI 900 may also be configured to allow a user to manage how other users may interact with the user's user profile and/or one or more personas 1000 within the user profile. For example, as shown in FIG. 10, a list of user profiles 1040 corresponding to other users of content management subsystem 110 may be displayed within GUI 900. The list of other user profiles 1040 may include the user profiles of one or more individuals, groups, and/or other organizations.

In some examples, a user may be able to associate one or more of the other user profiles 1040 with the user's user profile and/or one or more personas 1000 within with the user's user profile. For example, a user may configure profile settings such that a user profile for another user is associated with a first user persona (e.g., a "family" persona) but is not associated with another user persona (e.g., a "work" persona). Different levels of access permissions for each of the other user profiles 1040 may be set by the user as may serve a particular application.

In some examples, access subsystem 120 may be configured to provide one or more GUIs configured to allow a user to encrypt one or more content instances stored within content management subsystem 110 and specify one or more access rules for the encrypted content instances.

Figure 11:
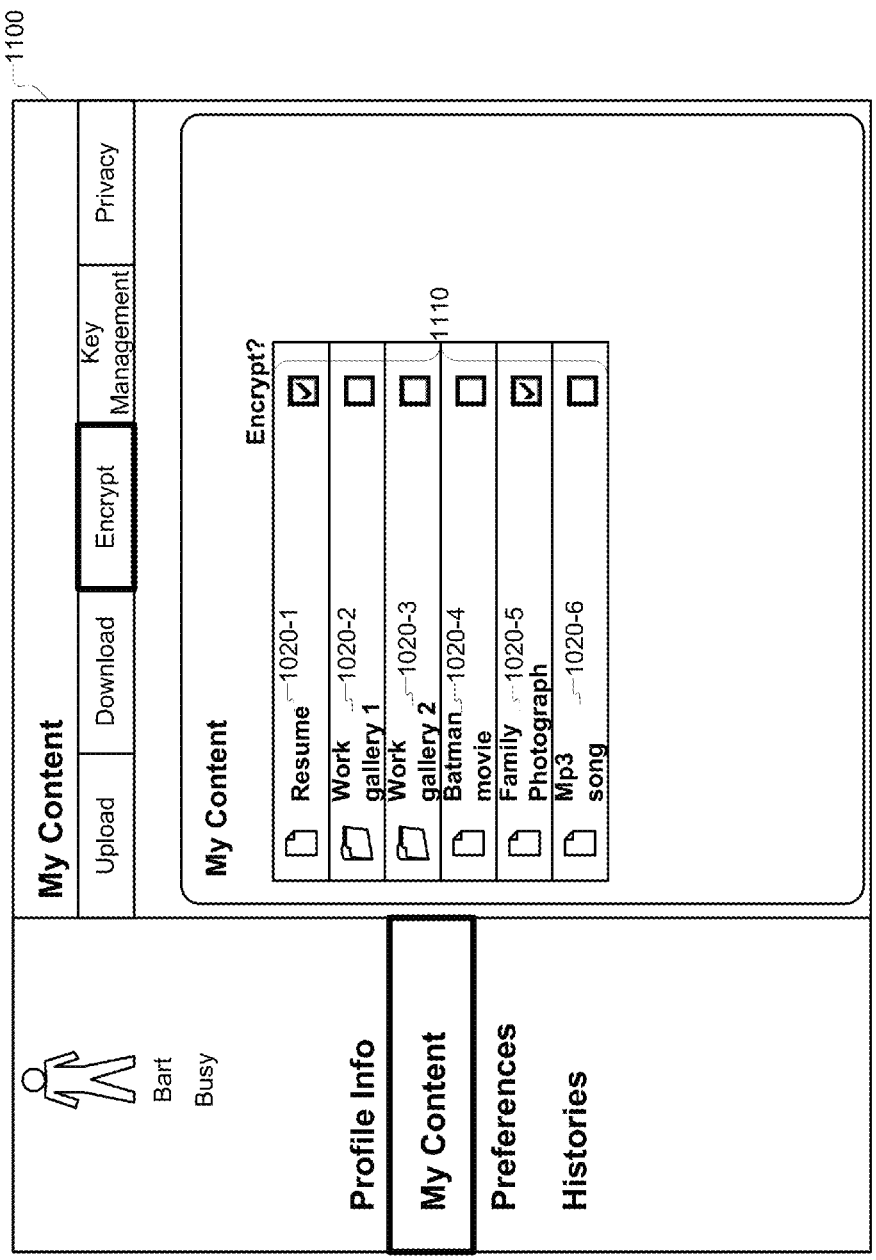
FIG. 11 shows a GUI configured to facilitate user-initiated encryption of one or more content instances stored within a content management subsystem according to principles described herein.

To illustrate, FIG. 11 shows a GUI 1100 configured to facilitate user-initiated encryption of one or more content instances 1020 stored within content management subsystem 110. As shown in FIG. 11, GUI 1100 shows a list of one or more content instances 1020 associated with a particular user 230 and that may be stored within content management subsystem 110. The user 230 may direct content management subsystem 110 to encrypt one or more of the content instances 1020 by selecting one or more of the checkboxes 1110. For example, FIG. 11 shows the user 230 has selected content instances 1020-1 and 1020-5 for encryption.

In some examples, content management subsystem 110 is configured to encrypt a selected content instance (e.g., 1020-1) using a key. The key may be generated by the content management subsystem 110, provided by user 230, or otherwise acquired by content management subsystem 110. The key may then be stored within content management subsystem 110 and, as will be described in more detail below, subsequently used to decrypt the encrypted content instance 1020-1.

In some examples, access subsystem 120 may display a GUI configured to allow user 230 to specify one or more access rules corresponding to one or more encrypted content instances stored within content management subsystem 110. The one or more access rules may be based on at least one user profile and/or at least one access device profile. In this manner, user 230 may control access to an encrypted content instance by creating one or more access rules for specific users, access devices, and/or types of access devices.

Figure 12:
FIG. 12 shows a GUI that may be displayed by access subsystem and configured to allow a user to specify one or more access rules corresponding to an encrypted content instance according to principles described herein.

For example, FIG. 12 shows a GUI 1200 that may be displayed by access subsystem 120 and configured to allow user 230 to specify one or more access rules corresponding to an encrypted content instance 1020-1. As shown in FIG. 12, GUI 1200 may include a list 1210 of individual user profiles and/or groups of user profiles. Selectable options 1220 representing various types or levels of access for each user profile may be displayed in connection with list 1210. In some examples, user 230 may select one or more of the selectable options 1220 to specify one or more access rules.

To illustrate, FIG. 12 shows selectable options 1220 representing various types of access to encrypted content instance 1020-1 that may be granted to one or more of the users associated with the user profiles within list 1210. For example, FIG. 12 shows that users associated with individual user profiles "Heath" and "Guy Smiley," as well as users having user profiles included within a group named "work community," have been given full access to content instance 1020-1. In other words, these users may access a key configured to facilitate decryption of the encrypted content instance 1020-1 and have full access to the decrypted content instance 1020-1. FIG. 12 also shows that users associated with user profiles "Robert" and "Don" have been given read only access to content instance 1020-1. In other words, these users may have access to the key configured to facilitate decryption of the encrypted content instance 1020-1 and have read-only access to the decrypted content instance 1020-1.

In some examples, as shown in FIG. 12, "expiring" access to content instance 1020-1 may be granted to one or more users. "Expiring" access may be limited to a user-defined time period (e.g., a number of days). After the specified time period has elapsed, access by the one or more users to the content instance 1020-1 may be prevented by blocking their access to the key associated with content instance 1020-1.

Other access rules may be specified or defined by user 230 utilizing GUI 1200 by selecting a "custom" button 1230 and/or one or more of the "more" buttons 1240. For example, the user 230 may define an access rule to allow another user to only access a particular content instance after a specified start time. In this manner, the content instance may not be decrypted until the specified time arrives. The time may be based on a time kept track of by content management subsystem 110 or any access device 220 as may serve a particular application.

One or more access rules may additionally or alternatively be based on one or more access device profiles. For example, FIG. 13 illustrates an exemplary GUI 1300 configured to allow a user to define one or more access rules that are based on one or more access device profiles. As shown in FIG. 13, a list of access device profiles 1310 may be displayed along with selectable options 1320 corresponding to each access device profile within list 1310. The list of access device profiles 1310 may include a description of one or more access devices 220 and/or types of access devices 220 that may potentially be used to request access to content instance 1020-1. The user may specify a type of access (e.g., full, read only, or none) that each access device 220 may have for content instance 1020-1.

To illustrate, a user may restrict access of certain types of content to certain types of access devices 220 that may be more capable than others of properly displaying or otherwise presenting the content of interest. For example, as shown in FIG. 13, the user may restrict "full" access of content instance 1020-1 to personal computers and broadband devices. In the illustrated examples, mobile phones are denied access and other handheld devices are given read only access to content instance 1020-1.

GUI 1300 may additionally or alternatively be configured to allow a user to specify other access rules based on one or more access device profiles. For example, GUI 1300 may be configured to allow a user to specify one or more content formatting procedures based on one or more access device profiles. To illustrate, a user may specify that photographs, video, and/or other graphics be reformatted to fit the display capabilities of a mobile phone, handheld device, or other access device. The reformatting may be performed by the content management subsystem 110 and/or the access subsystem 120.

Additionally or alternatively, a user may restrict access of content to access devices 220 having certain network addresses (e.g., network addresses corresponding to a particular geographic region, organization, etc.). To illustrate, a user may restrict access of content to access devices 220 that are a part of a particular company or that are physically located in a particular city, state, or region.

After one or more access rules have been defined for a particular encrypted content instance, content management subsystem 110 may be configured to perform a predefined action in response to a request received from an access device 220 to access the encrypted content's corresponding key.

The predefined action may be selected and performed by the content management subsystem 110 in accordance with the one or more access rules specified for the encrypted content instance. For example, the predefined action may include transmitting the key to the access device 220 and allowing access to the encrypted content instance in accordance with the specified access rules, encrypting the key and transmitting an encrypted copy of the key and another key for decrypting the encrypted key to the access device 220, denying the access device 220 access to the key, and/or otherwise processing the encrypted content instance and/or key.

In some examples, an access device 220 may be required to include an application client configured to facilitate access to an encrypted content instance. As described previously, the application client may include, but is not limited to, an image viewer, a media player, a document reader and/or editor, and/or any other suitable application as may serve a particular application. In some examples, the application client is configured to direct access device 220 to transmit a request to access a key corresponding to the encrypted content instance each time a user utilizing the access device 220 attempts to access the content instance. In this manner, for each access request, content management subsystem 110 may consider one or more access rules to verify that the requesting user and/or access device is authorized to access the encrypted content instance. Content management subsystem 110 may further be configured to determine if an updated version of the encrypted content instance has become available each time the access device 220 transmits the access request. If an updated encrypted content instance is available, it may be transmitted to the access device 220.

Once the content instance has been decrypted and opened by the application client, the application client may be further configured to block screenshots and/or other attempts to copy, distribute, or otherwise manipulate the content instance.

In some examples, a user sharing a content instance with other users may view whether and how many times a key is requested for the content instance. In some examples, content management subsystem 110 may transmit data representative of this information to access subsystem 120, which may be configured to display a GUI conveying such information to the user.

A number of exemplary implementations of the systems and methods described herein will now be given. It will be recognized that these examples are merely illustrative, and that many other implementations of the systems and methods may be realized.

In some examples, a photographer may utilize the systems and methods described herein to securely and controllably share proofs with a customer. The photographer may upload the proofs to content management subsystem 110 and direct the content management subsystem 110 to encrypt the proofs in a manner similar to that described herein. The photographer may then specify one or more access rules corresponding to the proofs. For example, the photographer may specify that the customer may have read-only access to the proofs for a certain time period (e.g., two weeks), during which time the customer may view the proofs an unlimited number of times and order prints. The photographer may further specify that the customer may not print the proofs or take them to another photographer for printing.

The customer may then download the encrypted proofs and access them using a suitable application client (e.g., a secure viewer). Each time the customer attempts to access the proofs (e.g., open the proofs for viewing), the application client transmits a request for the proofs' keys to content management subsystem 110. Content management subsystem 110 may process the request and provide the requested keys in accordance with the specified access rules. After the specified time period has expired, further requests to access the keys will be denied and the encrypted proofs will be rendered unviewable.

In other examples, a person may utilize the systems and methods described herein to securely share personal information (e.g., photos, documents, etc.) with online acquaintances. For example, a woman may meet a man on a dating website. After chatting for some time, she decides to share some photographs of herself with the man. The woman may upload the photographs to content management subsystem 110 and direct the content management subsystem 110 to encrypt the photographs in a manner similar to that described herein. The woman may then specify one or more access rules corresponding to the photographs. For example, the woman may specify that the man may have non-expiring read-only access to the photographs. After some time, the woman may decide to break up with the man. She may then edit the access rules corresponding to the photographs to revoke the man's access to the photographs and/or key(s) needed to decrypt the photographs. Further attempts by the man to access the photographs and/or keys will be denied by content management subsystem 110.

In other examples, a startup company may be going through a round of raising investment capital. An officer of the company may desire to provide potential investors with proprietary documents. The officer may upload the documents to content management subsystem 110 and direct the content management subsystem 110 to encrypt the documents in a manner similar to that described herein. The officer may then specify one or more access rules corresponding to the documents. For example, the officer may specify that the potential investors may have read-only access to the documents. After a suitable investor is found, the officer may edit the access rules corresponding to the documents to revoke the other potential investors' access to the documents. Further attempts by the other investors to access the documents and/or corresponding key(s) will be denied by content management subsystem 110.

Figure 14:
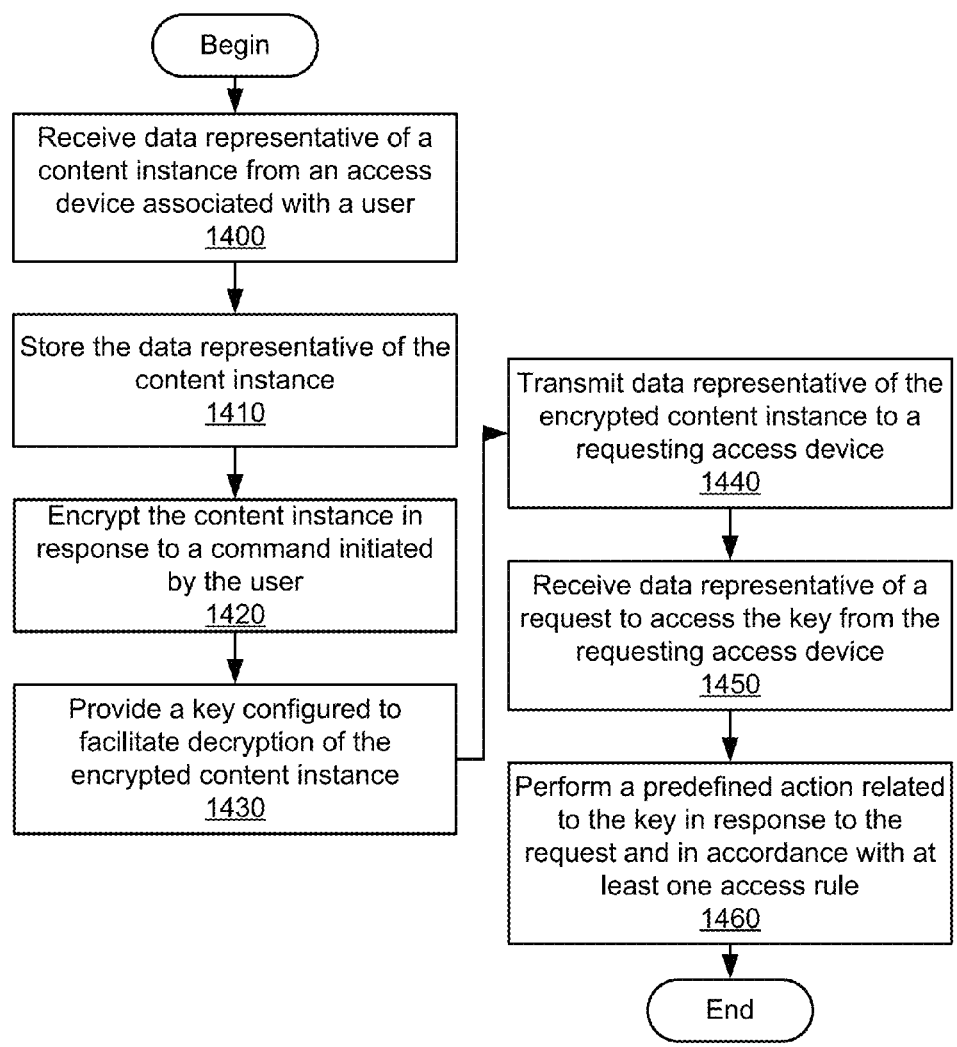
FIG. 14 illustrates an exemplary key-based content management and access method according to principles described herein.

FIG. 14 illustrates an exemplary key-based content management and access method. While FIG. 14 illustrates exemplary steps according to one embodiment, other embodiments may omit, add to, reorder, and/or modify any of the steps shown in FIG. 14.

In step 1400, data representative of a content instance is received from an access device associated with a user. In some examples, the data representative of a content instance is received by a content management subsystem, such as content management subsystem 110. The data representative of the content instance may be transmitted by the access device in any of the ways described herein, including over network 225.

In step 1410, the data representative of the content instance is stored. For example, the data representative of the content instance may be stored within a data store, such as data store 430.

In step 1420, the content instance is encrypted in response to a command initiated by the user. The content instance may be encrypted in any of the ways described herein.

In step 1430, a key is provided that is configured to facilitate decryption of the encrypted content instance. The key may be provided in any of the ways described herein. In some examples, the key is also used in step 1420 to encrypt the content instance.

In step 1440, data representative of the encrypted content instance is transmitted to a requesting access device. The data may be transmitted in any of the ways described herein, including transmitting a copy of the encrypted content instance over network 225.

In step 1450, data representative of a request to access the key is received from the requesting access device. The request may be transmitted and received in any of the ways described herein. For example, the request may be transmitted automatically by an application client residing within the access device when a user of the access device attempts to access the content instance (e.g., open a file).

In step 1460, the content management subsystem performs a predefined action related to the key in response to the communication. The predefined action may be selected and performed by the content management subsystem in accordance with one or more access rule specified for the content instance and may include transmitting the key to the requesting access device and allowing access to the encrypted content instance in accordance with the specified access rules, transmitting an encrypted copy of the key to the requesting access device, denying the requesting access device access to the key, and/or otherwise processing the encrypted content instance and/or key.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
receiving data representative of a content instance over a network from an access device associated with a first user;
encrypting the content instance in response to a command initiated by the first user by way of one or more graphical user interfaces, the encrypting resulting in an encrypted content instance;
providing, in response to the command initiated by the first user to encrypt the content instance, a key configured to facilitate decryption of the encrypted content instance;
creating, subsequent to the command initiated by the first user to encrypt the content instance and based on input provided by the first user by way of the one or more graphical user interfaces, at least one access rule corresponding to the encrypted content instance, the at least one access rule specifying an allowed level of access to the encrypted content instance for each of a plurality of different users and an allowed level of access to the encrypted content instance for each of a plurality of different types of access devices;
transmitting data representative of the encrypted content instance to a requesting access device associated with a requesting user;
receiving, from the requesting access device, data representative of a request to access the key over the network; and
performing a predefined action related to the key in response to the request and in accordance with the at least one access rule.

2. The method of claim 1, further comprising providing an interface configured to allow the first user to specify the at least one access rule.

3. The method of claim 1, wherein the predefined action comprises transmitting the key to the requesting access device.

4. The method of claim 3, further comprising using the key to decrypt the encrypted content instance.

5. The method of claim 4, further comprising deleting data representative of the key from the requesting access device after the encrypted content instance is decrypted.

6. The method of claim 1, further comprising requiring the requesting access device to request the key over the network each time the requesting access device attempts to access the encrypted content instance.

7. The method of claim 1, wherein the predefined action comprises denying the requesting access device access to the key.

8. The method of claim 1, further comprising defining the at least one access rule to grant the requesting access device associated with an access device profile at least one type of access to the encrypted content instance.

9. The method of claim 1, further comprising encrypting the key and providing another key configured to facilitate decryption of the key.

10. The method of claim 1, further comprising modifying the at least one access rule in response to another command initiated by the first user.

11. The method of claim 10, wherein the modifying of the at least one access rule comprises revoking access to the encrypted content instance for the requesting user.

12. The method of claim 1, wherein the at least one access rule specifies a content formatting procedure for the encrypted content instance transmitted to the requesting access device associated with the requesting user.

13. The method of claim 1, wherein the allowed level of access to the encrypted content instance for each of the plurality of different types of access devices comprises a full access level to the encrypted content instance for a first type of access device included in the plurality of different types of access devices, a read-only access level to the encrypted content instance for a second type of access device included in the plurality of different types of access devices, and a no access level to the encrypted content instance for a third type of access device included in the plurality of different types of access devices.

14. A system comprising:
   an access subsystem, associated with a first user, that transmits data representative of a content instance associated with the first user over a network; and
   a content management subsystem that:
      receives the data representative of the content instance from the access subsystem, and
      encrypts the content instance in response to a command initiated by the first user by way of one or more graphical user interfaces;
   wherein the access subsystem creates, subsequent to the command initiated by the first user to encrypt the content instance and based on input provided by the first user by way of one or more graphical user interfaces, at least one access rule corresponding to the content instance, the at least one access rule specifying an allowed level of access to the content instance for each of a plurality of different users and an allowed level of access to the content instance for each of a plurality of different types of access devices; and
   wherein the content management system:
      provides, in response to the command initiated by the first user to encrypt the content instance, a key configured to facilitate decryption of the content instance,
      receives, from a requesting access device associated with a requesting user, data representative of a request to access the key, and
      performs a predefined action related to the key in response to the request and in accordance with the at least one access rule.

15. The system of claim 14, wherein the predefined action comprises transmitting the key to the requesting access device.

16. The system of claim 14, wherein the predefined action comprises denying the requesting access device access to the key.

17. The system of claim 14, wherein the at least one access rule grants the requesting access device associated with the requesting user at least one type of access to the encrypted content instance.

18. The system of claim 14, wherein the content management subsystem encrypts the key and provides another key configured to facilitate decryption of the key.

19. The system of claim 14, wherein the content management subsystem modifies the at least one access rule in response to another command initiated by the first user.

20. A system comprising:
   at least one computing device that
      receives data representative of a content instance over a network from an access device associated with a first user;
      encrypts the content instance in response to a command initiated by the first user by way of one or more graphical user interfaces, the encrypting resulting in an encrypted content instance;
      provides, in response to the command initiated by the first user to encrypt the content instance, a key configured to facilitate decryption of the encrypted content instance;
      creates, subsequent to the command initiated by the first user to encrypt the content instance and based on input provided by the first user by way of the one or more graphical user interfaces, at least one access rule corresponding to the encrypted content instance, the at least one access rule specifying an allowed level of access to the encrypted content instance for each of a plurality of different users and an allowed level of access to the encrypted content instance for each of a plurality of different types of access devices;
      transmits data representative of the encrypted content instance to a requesting access device associated with a requesting user;
      receives, from the requesting access device, data representative of a request to access the key over the network; and
      performs a predefined action related to the key in response to the request and in accordance with the at least one access rule.

* * * * *